US010241273B2

(12) United States Patent
Tu et al.

(10) Patent No.: US 10,241,273 B2
(45) Date of Patent: Mar. 26, 2019

(54) POLARIZATION ROTATOR AND OPTICAL SIGNAL PROCESSING METHOD

(71) Applicant: HUAWEI TECHNOLOGIES CO., LTD., Shenzhen, Guangdong (CN)

(72) Inventors: Xin Tu, Wuhan (CN); Yuming Wei, Shenzhen (CN); Hongyan Fu, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 17 days.

(21) Appl. No.: 15/795,626

(22) Filed: Oct. 27, 2017

(65) Prior Publication Data
US 2018/0059324 A1 Mar. 1, 2018

Related U.S. Application Data

(63) Continuation of application No. PCT/CN2015/078128, filed on Apr. 30, 2015.

(51) Int. Cl.
G02B 6/27 (2006.01)
G02B 6/34 (2006.01)
G02B 6/14 (2006.01)

(52) U.S. Cl.
CPC ............ G02B 6/2766 (2013.01); G02B 6/14 (2013.01); G02B 6/34 (2013.01)

(58) Field of Classification Search
CPC . G02B 6/26; G02B 6/126; G02B 6/27; G02B 6/274; G02B 6/2766
See application file for complete search history.

(56) References Cited

U.S. PATENT DOCUMENTS 7,792,403 B1   9/2010 Little et al.
8,750,651 B2   6/2014 Chen
(Continued)

FOREIGN PATENT DOCUMENTS

CN   101765796   6/2010
CN   102736184   10/2012

OTHER PUBLICATIONS

Zhechao Wang and Daoxin Dai, "Ultrasmall Si-nanowire-based polarization rotator," J. Opt. Soc. Am. B 25, 747-753 (2008).*
(Continued)

Primary Examiner — Peter Radkowski
(74) Attorney, Agent, or Firm — Staas & Halsey LLP

(57) ABSTRACT

A polarization rotator and an optical signal processing method are disclosed. A first transceiving waveguide includes a first end and a second end; a polarization rotation region waveguide includes a first waveguide and a second waveguide, where the first waveguide is located above the second waveguide, the first waveguide is connected to the second end of the first transceiving waveguide, the first waveguide and the second waveguide are non-linear profile waveguides; a mode conversion region waveguide includes a third waveguide and a fourth waveguide, where the third waveguide is connected to the second waveguide, the fourth waveguide is on a same horizontal plane as the third waveguide and the second waveguide, the third waveguide and the fourth waveguide are non-linear profile waveguides; and the second transceiving waveguide includes a third end and a fourth end, where the third end of the second transceiving waveguide is connected to the fourth waveguide.

16 Claims, 9 Drawing Sheets

(56) References Cited

U.S. PATENT DOCUMENTS

| | | |
|---|---|---|
| 2008/0019637 A1 | 1/2008 | Little et al. |
| 2010/0202724 A1 | 8/2010 | Little et al. |
| 2014/0153862 A1 | 6/2014 | Picard et al. |
| 2014/0270620 A1 | 9/2014 | Anderson et al. |

OTHER PUBLICATIONS

Daoxin Dai and John E. Bowers, "Novel concept for ultracompact polarization splitter-rotator based on silicon nanowires," Opt. Express 19, 10940-10949 (2011)Bayat et al., Ultra-compact photonic crystal based polarization rotator, Optics Express, V. 17, N. 9, 2009.*

Bayat et al., Ultra-compact photonic crystal based polarization rotator, Optics Express, V. 17, N. 9, 2009.* van der Tol et al., Increasing Tolerance in Passive Integrated Optical Polarization Converters, Journal of Lightwave Technology, V. 30, N. 17, 2012.*

Liu Liu, Yunhong Ding, Kresten Yvind, and Jørn M. Hvam, "Efficient and compact TE-TM polarization converter built on silicon-on-insulator platform with a simple fabrication process," Opt. Lett. 36, 1059-1061 (2011).*

Henghua Deng, D. O. Yevick, C. Brooks and P. E. Jessop, "Design rules for slanted-angle polarization rotators," in Journal of Lightwave Technology, vol. 23, No. 1, pp. 432-445, Jan. 2005.*

Zhang et al., Silicon waveguide based TE mode converter, Optics Express, V. 18, N. 24, 2010.*

J. Yamauchi, M. Yamanoue and H. Nakano, "A Short Polarization Converter Using a Triangular Waveguide," in Journal of Lightwave Technology, vol. 26, No. 12, pp. 1708-1714, Jun. 15, 2008. doi: 10.1109/JLT.2008.919424.*

Alonso-Ramos, I Integrated polarization rotator for ultra-high-speed optical communication systems, 2012, May 15, 2012, SPIE Newsroom. DOI: 10.1117/2.1201204.004194, available at http://spie.org/newsroom/4194-integrated-polarization-rotator-for-ultra-high-speed-optical-communication-systems?SSO=1.*

Huang et al., Realization of a Compact and Single-Mode Optical Passive Polarization Converter, Photonics Technology Letters, V. 12, N. 3, 2000.*

Leach et al., Measuring the Orbital Angular Momentum of a Single Photon, Physical Review Letters, V. 88, N. 25, 2002.*

Guoqiang Chen, Lixue Chen, Weiqiang Ding, Fangkui Sun, and Rui Feng, "Ultra-short Silicon-on-Insulator (SOI) polarization rotator between a slot and a strip waveguide based on a nonlinear raised cosine flat-tip taper," Opt. Express 21, 14888-14894 (2013).*

Hang Guan, Yangjin Ma, Ruizhi Shi, Ari Novack, Jingcheng Tao, Qing Fang, Andy Eu-Jin Lim, Guo-Qiang Lo, Tom Baehr-Jones, and Michael Hochberg, "Ultracompact silicon-on-insulator polarization rotator for polarization-diversified circuits," Opt. Lett. 39, 4703-4706 (2014).*

Daoxin Dai, Yongbo Tang, and John E Bowers, "Mode conversion in tapered submicron silicon ridge optical waveguides," Opt. Express 20, 13425-13439 (2012).*

Troia et al., Design and Optimization of Polarization Splitting and Rotating Devices in Silicon-on-Insulator Technology, Feb. 2014, Advances in OptoElectronics.*

Daigao Chen, Xi Xiao, Lei Wang, Yu Yu, Wen Liu, and Qi Yang, "Low-loss and fabrication tolerant silicon mode-order converters based on novel compact tapers," Opt. Express 23, 11152-11159 (2015).*

Obayya et al., Beam Propagation Modeling of Polarization Rotation in Deeply Etched Semiconductor Bent Waveguides, Photonics Technology Letters, V. 13, N. 7, 2001.*

Fontaine et al., Modeling of a Passive Polarization Converter Free of Longitudinally-Periodic Structure, IMH12-1, 1996.*

Heng, Lee,: Silicon waveguide that converts polarization mode of light could speed up photonic circuits operation, 2011.*

International Search Report, dated Jan. 28, 2016, in International Application No. PCT/CN2015/078128 (4 pp.).

Zhechao Wang et al., *Ultrasmall Si-nanowire-based polarization rotator*, Journal of the Optical Society of America, vol. 25, No. 5, May 2008, pp. 747-753.

Wesley D. Sacher et al., *Polarization rotator-splitters and controllers in a $Si_3N_4$-on-SOI integrated photonics platform*, Optics Express, vol. 22, No. 9, May 5, 2014, pp. 11167-11174.

Linfei Gao et al., *Ultra-Compact and Low-Loss Polarization Rotator Based on Asymmetric Hybrid Plasmonic Waveguide*, IEEE Photonics Technology Letters, vol. 25, No. 21, Nov. 1, 2013, pp. 2081-2084.

International Search Report, dated Jan. 28, 2016, in International Application No. PCT/CN2015/078128 (5 pp.).

Written Opinion of the International Searching Authority, dated Jan. 28, 2016, in International Application No. PCT/CN2015/078128 (8 pp.).

* cited by examiner

US 10,241,273 B2

POLARIZATION ROTATOR AND OPTICAL SIGNAL PROCESSING METHOD

CROSS-REFERENCE TO RELATED APPLICATIONS

This application is a continuation of International Application No. PCT/CN2015/078128, filed on Apr. 30, 2015, the disclosure of which is hereby incorporated by reference in its entirety.

TECHNICAL FIELD

The present invention relates to the optoelectronic product field, and in particular, to a polarization rotator and an optical signal processing method.

BACKGROUND

Optical fiber communication is one of main transmission technologies of modern information networks. A photonic integrated circuit (PIC) chip is a core component of an optical communications device in an optical fiber communications system. To eliminate an effect on an optical signal caused by polarization when the optical signal is transmitted in the PIC chip, and ensure transmission quality of the optical signal, the PIC chip needs to separately process optical signals in different polarization states. For example, a polarization beam splitter, a polarization rotator, and the like in the PIC chip may be used to separate a transverse electric wave (TE) mode optical signal and a transverse magnetic wave (TM) mode optical signal for processing in two optical paths. A polarization rotator is an indispensable component of a polarization diversity system.

In the prior art, a schematic structural diagram of a corner-cut type asymmetric polarization rotator is provided. As shown in FIG. 1, the corner-cut type asymmetric polarization rotator includes an input end 11, a corner-cut polarization rotation region 12, and an output end 13. The input end, the corner-cut polarization rotation region, and the output end are connected sequentially. The corner-cut type asymmetric polarization rotator may be made from silicon and is located in a cladding layer whose material is silica. When the TE mode optical signal is input from the input end and transmitted to the corner-cut polarization rotation region, because a rectangular waveguide becomes an asymmetric waveguide with an L-shaped cross-section, mode hybridization occurs on the TE mode optical signal, the TE mode optical signal is converted into a TM mode optical signal at the end of the corner-cut polarization rotation region, and the TM mode optical signal is output from the output end. Alternatively, when the TM mode optical signal is input from the input end and transmitted to the corner-cut polarization rotation region, because a rectangular waveguide becomes an asymmetric waveguide with an L-shaped cross-section, mode hybridization occurs on the TM mode optical signal, the TM mode optical signal is converted into a TE mode optical signal at the end of the corner-cut polarization rotation region, and the TE mode optical signal is output from the output end. In this way, conversion of a polarization optical signal is implemented. However, the polarization rotation region of the corner-cut type asymmetric polarization rotator is implemented by using a partial etching process in a complementary metal oxide semiconductor (CMOS) process, and performance of the corner-cut type asymmetric polarization rotator is sensitive to a process tolerance. The process tolerance leads to uncertainty in etching depth and sidewall angles, and therefore severely affects conversion efficiency.

In the prior art, a schematic structural diagram of a two-layer asymmetric silicon nitride-silicon waveguide polarization rotator is further provided. As shown in FIG. 2, the two-layer asymmetric silicon nitride-silicon waveguide polarization rotator includes an irregular silicon nitride layer waveguide 21 at the first layer and a silicon layer waveguide 22 at the second layer. The first layer is located above the second layer. The silicon layer waveguide at the second layer includes a first isosceles trapezoidal waveguide 221, a rectangular waveguide 222, and a second isosceles trapezoidal waveguide 223. The first isosceles trapezoidal waveguide, the rectangular waveguide, and the second isosceles trapezoidal waveguide are connected sequentially. A vertical spacing between the waveguide at first layer and the waveguide at the second layer is not more than 1 micron. The first isosceles trapezoidal waveguide serves as an input end, the rectangular waveguide and the silicon nitride layer waveguide serve as a polarization rotation region, and the second isosceles trapezoidal waveguide serves as an output end. When a TE mode optical signal is input from the input end to the polarization rotation region, the TE mode optical signal is coupled to the two-layer waveguides in the polarization rotation region, mode hybridization occurs, the TE mode optical signal is converted into a TM mode optical signal at the end of the polarization rotation region, and the TM mode optical signal is output from the output end. Alternatively, when a TM mode optical signal is input from the input end to the polarization rotation region, the TM mode optical signal is coupled to the two-layer waveguides in the polarization rotation region, mode hybridization occurs, the TM mode optical signal is converted into a TE mode optical signal at the end of the polarization rotation region, and the TE mode optical signal is output from the output end. In this way, conversion of a polarization optical signal is implemented. However, the polarization rotation region of the polarization rotator is a linear profile waveguide. In order to implement conversion of the polarization optical signal, the linear profile waveguide in the polarization rotation region needs to be at least 400 microns. Therefore, the polarization rotator is large, which is unfavorable for high-density integration of the PIC chip.

Therefore, how to achieve higher conversion efficiency and ensure a smaller size of the polarization rotator in a process of converting optical signal polarization states is an urgent issue to be addressed.

SUMMARY

Embodiments of the present invention provide a polarization rotator and an optical signal processing method, so as to achieve higher conversion efficiency and ensure a smaller size of the polarization rotator in a process of converting optical signal polarization states.

To achieve the foregoing objective, the following technical solutions are used in the embodiments of the present invention:

According to a first aspect, a polarization rotator is provided, including:

a first transceiving waveguide, including a first end and a second end;

a polarization rotation region waveguide, including a first waveguide and a second waveguide, where the first waveguide is located above the second waveguide, the first waveguide is connected to the second end of the first transceiving waveguide, the first waveguide is a non-linear profile waveguide, and the second waveguide is a non-linear profile waveguide;

a mode conversion region waveguide, including a third waveguide and a fourth waveguide, where the third waveguide is connected to the second waveguide, the fourth waveguide is on a same horizontal plane as the third waveguide and the second waveguide, the third waveguide is a non-linear profile waveguide, and the fourth waveguide is a non-linear profile waveguide, where the first transceiving waveguide does not overlap the second waveguide; and a second transceiving waveguide, including a third end and a fourth end, where the third end of the second transceiving waveguide is connected to the fourth waveguide, a distance between the fourth end and the second end of the first transceiving waveguide is greater than a distance between the third end and the second end of the first transceiving waveguide; where the first transceiving waveguide is configured to receive an L-order mode transverse magnetic wave TM mode optical signal, the polarization rotation region waveguide is configured to convert the L-order mode TM mode optical signal into an N-order mode transverse electric wave TE mode optical signal, the mode conversion region waveguide is configured to convert the N-order mode TE mode optical signal into an M-order mode TE mode optical signal, and the second transceiving waveguide is configured to output the converted-to M-order mode TE mode optical signal, where N is not equal to M; or the second transceiving waveguide is configured to receive an M-order mode TE mode optical signal, the mode conversion region waveguide is configured to convert the M-order mode TE mode optical signal into an N-order mode TE mode optical signal, the polarization rotation region waveguide is configured to convert the N-order mode TE mode optical signal into an L-order mode TM mode optical signal, and the first transceiving waveguide is configured to output the converted-to L-order mode TM mode optical signal, where N is not equal to M.

According to a second aspect, an optical signal processing method applied to a polarization rotator is provided, where the polarization rotator includes a first transceiving waveguide, a polarization rotation region waveguide, a mode conversion region waveguide, and a second transceiving waveguide, where the first transceiving waveguide includes a first end and a second end; the polarization rotation region waveguide includes a first waveguide and a second waveguide, where the first waveguide is located above the second waveguide, the first waveguide is connected to the second end of the first transceiving waveguide, the first waveguide is a non-linear profile waveguide, and the second waveguide is a non-linear profile waveguide; the mode conversion region waveguide includes a third waveguide and a fourth waveguide, where the third waveguide is connected to the second waveguide, the fourth waveguide is on a same horizontal plane as the third waveguide and the second waveguide, the third waveguide is a non-linear profile waveguide, and the fourth waveguide is a non-linear profile waveguide, where the first transceiving waveguide does not overlap the second waveguide; and the second transceiving waveguide includes a third end and a fourth end, where the third end of the second transceiving waveguide is connected to the fourth waveguide, and a distance between the fourth end and the second end of the first transceiving waveguide is greater than a distance between the third end and the second end of the first transceiving waveguide; and the method includes:

receiving, by the first transceiving waveguide, an L-order mode transverse magnetic wave TM mode optical signal;

converting, by the polarization rotation region waveguide, the L-order mode TM mode optical signal into an N-order mode transverse electric wave TE mode optical signal;

converting, by the mode conversion region waveguide, the N-order mode TE mode optical signal into an M-order mode TE mode optical signal; and outputting, by the second transceiving waveguide, the converted-to M-order mode TE mode optical signal, where N is not equal to M.

According to a third aspect, an optical signal processing method applied to a polarization rotator is provided, where the polarization rotator includes a first transceiving waveguide, a polarization rotation region waveguide, a mode conversion region waveguide, and a second transceiving waveguide, where the first transceiving waveguide includes a first end and a second end; the polarization rotation region waveguide includes a first waveguide and a second waveguide, where the first waveguide is located above the second waveguide, the first waveguide is connected to the second end of the first transceiving waveguide, the first waveguide is a non-linear profile waveguide, and the second waveguide is a non-linear profile waveguide; the mode conversion region waveguide includes a third waveguide and a fourth waveguide, where the third waveguide is connected to the second waveguide, the fourth waveguide is on a same horizontal plane as the third waveguide and the second waveguide, the third waveguide is a non-linear profile waveguide, and the fourth waveguide is a non-linear profile waveguide, where the first transceiving waveguide does not overlap the second waveguide; and the second transceiving waveguide includes a third end and a fourth end, where the third end of the second transceiving waveguide is connected to the fourth waveguide, and a distance between the fourth end and the second end of the first transceiving waveguide is greater than a distance between the third end and the second end of the first transceiving waveguide; and the method includes:

receiving, by the second transceiving waveguide, an M-order mode transverse electric wave TE mode optical signal;

converting, by the mode conversion region waveguide, the M-order mode TE mode optical signal into an N-order mode TE mode optical signal;

converting, by the polarization rotation region waveguide, the N-order mode TE mode optical signal into an L-order mode transverse magnetic wave TM mode optical signal; and outputting, by the first transceiving waveguide, the converted-to L-order mode TM mode optical signal, where N is not equal to M.

BRIEF DESCRIPTION OF DRAWINGS

To describe the technical solutions in the embodiments of the present invention or in the prior art more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
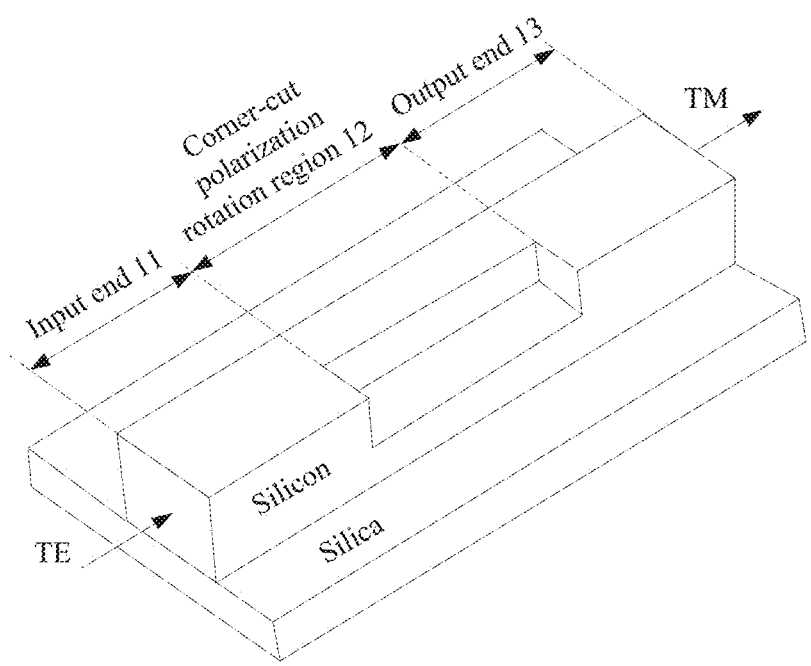
FIG. 1 is a schematic structural diagram of a corner-cut type asymmetric polarization rotator according to the prior art.
Figure 2:
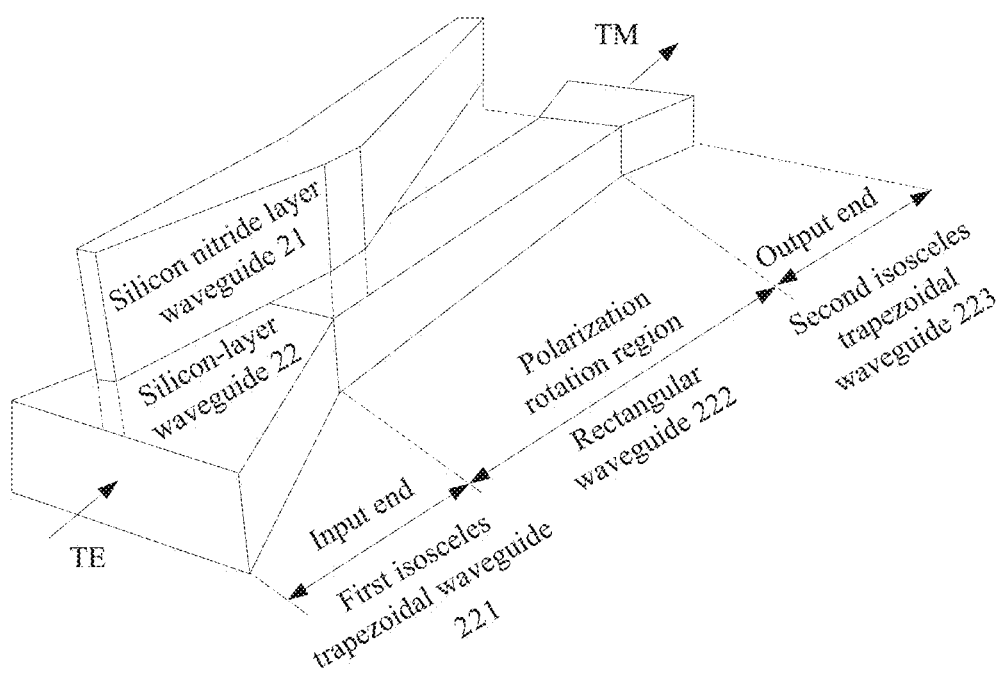
FIG. 2 is a schematic structural diagram of a two-layer asymmetric silicon nitride-silicon waveguide polarization rotator according to the prior art.
Figure 3:
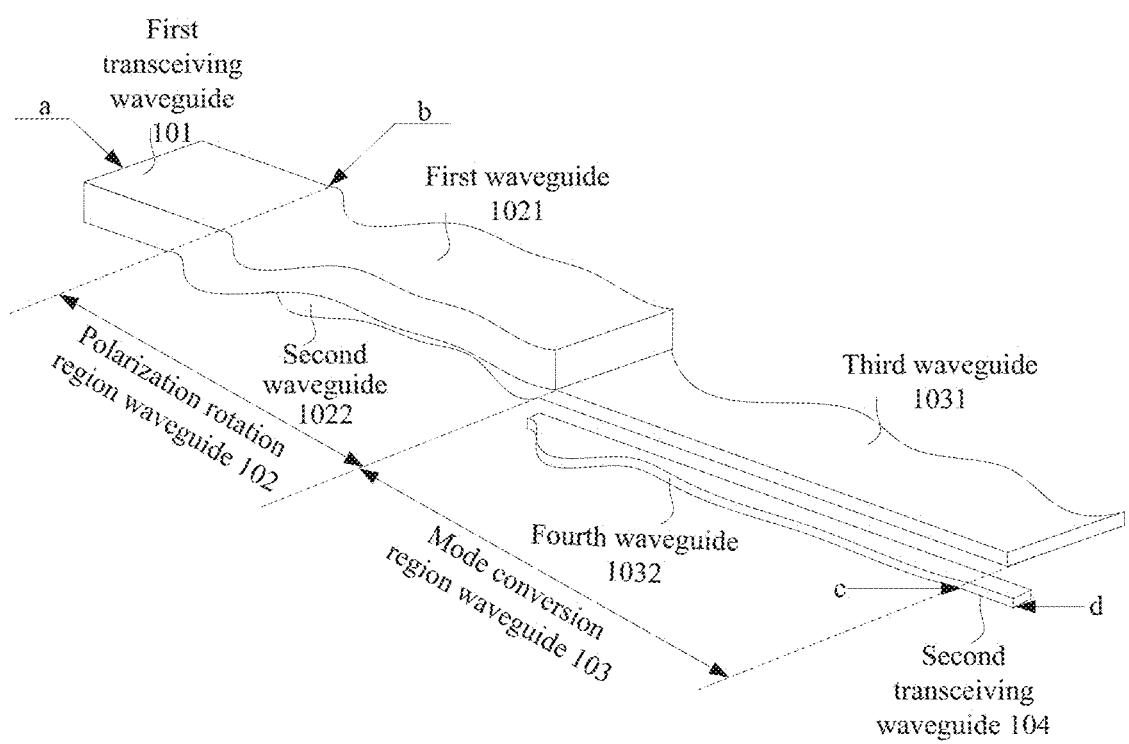
FIG. 3 is a schematic structural diagram of a polarization rotator according to an embodiment of the present invention.

An embodiment of the present invention provides a polarization rotator 10. As shown in FIG. 3, the polarization rotator 10 includes:

The first transceiving waveguide 101 includes a first end a and a second end b.

The polarization rotation region waveguide 102 includes a first waveguide 1021 and a second waveguide 1022. The first waveguide is located above the second waveguide, the first waveguide is connected to the second end of the first transceiving waveguide, the first waveguide is a non-linear profile waveguide, and the second waveguide is a non-linear profile waveguide.

It should be noted that the non-linear profile waveguide means that a profile of the waveguide is non-linear. The non-linear (non-linear) refers to a mathematical relationship between variables, not a straight line but a curve, a surface, a broken line, a fold surface, or an indefinite attribute, that is, non-linear. The non-linear profile waveguide means that a profile of a waveguide, along a light propagation direction, is not a straight line but a curve or a broken line.

The mode conversion region waveguide 103 includes a third waveguide 1031 and a fourth waveguide 1032. The third waveguide is connected to the second waveguide, the fourth waveguide is on a same horizontal plane as the third waveguide and the second waveguide, the third waveguide is a non-linear profile waveguide, and the fourth waveguide is a non-linear profile waveguide. The first transceiving waveguide does not overlap the second waveguide.

The second transceiving waveguide 104 includes a third end c and a fourth end d. The third end of the second transceiving waveguide is connected to the fourth waveguide, a distance between the fourth end and the second end of the first transceiving waveguide is greater than a distance between the third end and the second end of the first transceiving waveguide. The first transceiving waveguide is configured to receive an L-order mode transverse magnetic wave TM mode optical signal, the polarization rotation region waveguide is configured to convert the L-order mode TM mode optical signal into an N-order mode transverse electric wave TE mode optical signal, the mode conversion region waveguide is configured to convert the N-order mode TE mode optical signal into an M-order mode TE mode optical signal, and the second transceiving waveguide is configured to output the converted-to M-order mode TE mode optical signal, where N is not equal to M.

Alternatively, the second transceiving waveguide is configured to receive an M-order mode TE mode optical signal, the mode conversion region waveguide is configured to convert the M-order mode TE mode optical signal into an N-order mode TE mode optical signal, the polarization rotation region waveguide is configured to convert the N-order mode TE mode optical signal into an L-order mode TM mode optical signal, and the first transceiving waveguide is configured to output the converted-to L-order mode TM mode optical signal, where N is not equal to M. L may be equal to N, or L may not be equal to N. or L may be equal to M, or L may not be equal to M.

As such, the polarization rotation region waveguide of the polarization rotator includes a first waveguide whose profile is non-linear and a second waveguide whose profile is non-linear, and the mode conversion region waveguide includes a third waveguide whose profile is non-linear and a fourth waveguide whose profile is non-linear. The first waveguide is located above the second waveguide, and the fourth waveguide is on a same horizontal plane as the third waveguide and the second waveguide. Compared with the prior art in which a polarization optical signal is converted by using a longer linear profile waveguide, the polarization rotator described in the present invention is a non-linear profile waveguide. The non-linear profile waveguide better matches distribution of light energy, and a size of the polarization rotator can be reduced by reducing at least one of a length of the polarization rotation region waveguide or a length of the mode conversion region waveguide, so that higher conversion efficiency is achieved and a smaller size of the polarization rotator is ensured in a process of converting optical signal polarization states.

It should be noted that a specific non-linear profile waveguide is designed according to distribution of light energy of a specific optical signal. The specific optical signal is an optical signal of 1530 nanometers to 1565 nanometers; and according to the distribution of the light energy of the specific optical signal when the specific optical signal is transmitted in the specific non-linear profile waveguide, the specific non-linear profile waveguide is optimized.

Further, the first waveguide includes at least two sub-waveguides, the second waveguide includes at least two sub-waveguides, sizes and shapes of the sub-waveguides are different, the sub-waveguides in the first waveguide are connected sequentially, and the sub-waveguides in the second waveguide are connected sequentially; and the third waveguide includes at least two sub-waveguides, the fourth waveguide includes at least two sub-waveguides, sizes and shapes of the sub-waveguides are different, the sub-waveguides in the third waveguide are connected sequentially, and the sub-waveguides in the fourth waveguide are connected sequentially.

Further, the first transceiving waveguide and the second transceiving waveguide are rectangular waveguides, the sub-waveguides of the first waveguide are trapezoidal waveguides, the sub-waveguides of the second waveguide are trapezoidal waveguides, the sub-waveguides of the third waveguide are trapezoidal waveguides, and the sub-waveguides of the fourth waveguide are trapezoidal waveguides.

Optionally, the first transceiving waveguide and the second transceiving waveguide are rectangular waveguides, the sub-waveguides of the first waveguide are isosceles trapezoidal waveguides of different sizes, the sub-waveguides of the second waveguide are isosceles trapezoidal waveguides of different sizes, the sub-waveguides of the third waveguide are right-angled trapezoidal waveguides of different sizes, and the sub-waveguides of the fourth waveguide are right-angled trapezoidal waveguides of different sizes.

A length of each sub-waveguide is greater than 0 microns and is less than or equal to 2 microns, so that both the length of the polarization rotation region waveguide and the length of the mode conversion region waveguide are less than a length of a polarization rotation region waveguide whose profile is linear in the prior art, thereby reducing the size of the polarization rotator.

A height of the first transceiving waveguide is greater than or equal to 200 nanometers and is less than or equal to 1000 nanometers, and a height of the sub-waveguide of the first waveguide is greater than or equal to 200 nanometers and is less than or equal to 1000 nanometers.

A height of the sub-waveguide of the second waveguide is greater than or equal to 100 nanometers and is less than or equal to 500 nanometers, a height of the sub-waveguide of the third waveguide is greater than or equal to 100 nanometers and is less than or equal to 500 nanometers, a height of the sub-waveguide of the fourth waveguide is greater than or equal to 100 nanometers and is less than or equal to 500 nanometers, and a height of the second transceiving waveguide is greater than or equal to 100 nanometers and is less than or equal to 500 nanometers. A vertical spacing between the first waveguide and the second waveguide is greater than 0 microns and is less than or equal to 1 micron. A horizontal distance between the third waveguide and the fourth waveguide is greater than or equal to 10 nanometers and is less than or equal to 500 nanometers.

It should be noted that materials of the first transceiving waveguide and the first waveguide are silicon nitride, and materials of the second waveguide, the third waveguide, the fourth waveguide, and the second transceiving waveguide are silicon. The polarization rotator is located at a cladding layer, and a material of the cladding layer is silica or a polymer material. The polymer material may be polymethyl methacrylate (PMMA).

Figure 4:
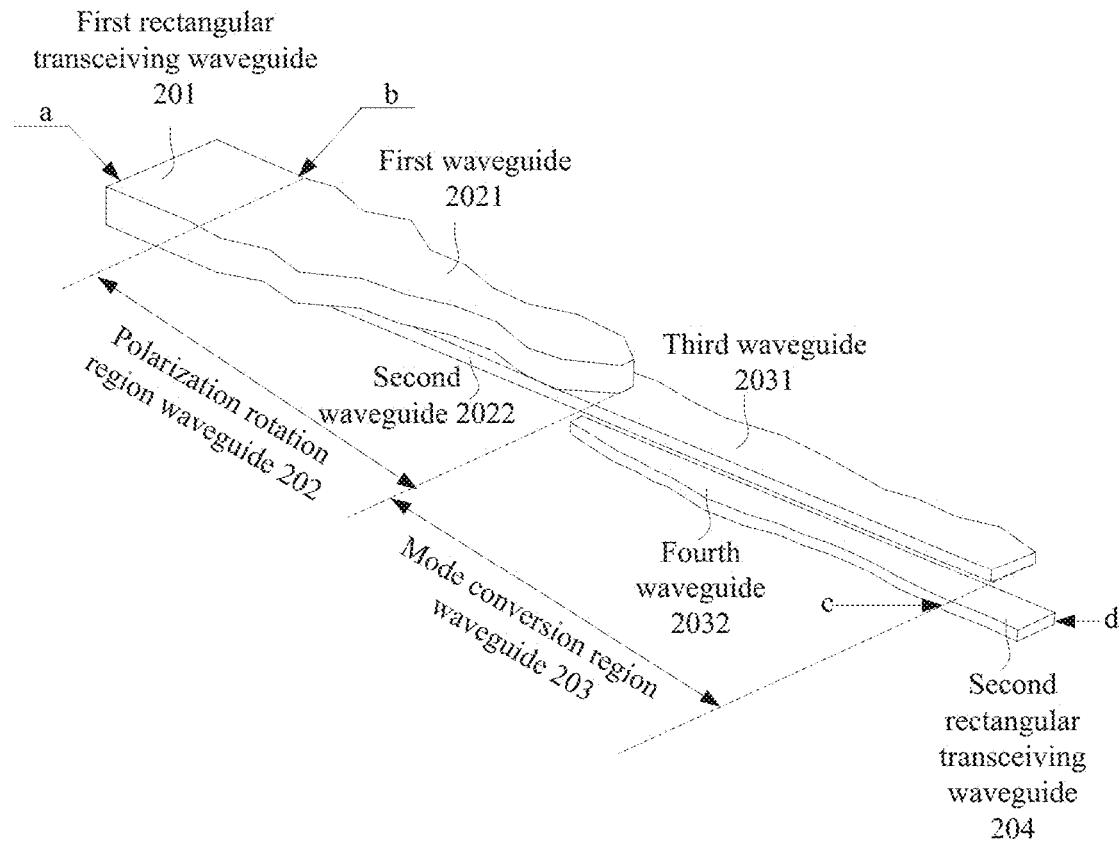
FIG. 4 is a schematic structural diagram of another polarization rotator according to an embodiment of the present invention.

An embodiment of the present invention provides a polarization rotator 20. As shown in FIG. 4, the polarization rotator includes: a first rectangular transceiving waveguide 201, including a first end a and a second end b;

a polarization rotation region waveguide 202, including a first waveguide 2021 and a second waveguide 2022, where the first waveguide is located above the second waveguide, the first waveguide is connected to the second end b of the first rectangular transceiving waveguide, the first waveguide includes ten isosceles trapezoidal sub-waveguides of different sizes, the second waveguide includes ten isosceles trapezoidal sub-waveguides of different sizes, the sub-waveguides in the first waveguide are connected sequentially, and the sub-waveguides in the second waveguide are connected sequentially;

a mode conversion region waveguide 203, including a third waveguide 2031 and a fourth waveguide 2032, where the third waveguide is connected to the second waveguide, the fourth waveguide is on a same horizontal plane as the third waveguide and the second waveguide, the third waveguide includes ten right-angled trapezoidal sub-waveguides of different sizes, the fourth waveguide includes ten right-angled trapezoidal sub-waveguides of different sizes, the sub-waveguides in the third waveguide are connected sequentially, and the sub-waveguides in the fourth waveguide are connected sequentially, where the first rectangular transceiving waveguide does not overlap the second waveguide; and a second rectangular transceiving waveguide 204, including a third end c and a fourth end d, where the third end of the second rectangular transceiving waveguide is connected to the fourth waveguide, a distance between the fourth end and the second end of the first rectangular transceiving waveguide is greater than a distance between the third end and the second end of the first rectangular transceiving waveguide.

Specifically, a material of the first rectangular transceiving waveguide is silicon nitride. A height of the first rectangular transceiving waveguide is 400 nanometers.

A material of the second rectangular transceiving waveguide is silicon. A height of the second rectangular transceiving waveguide is 150 nanometers.

A material of the first waveguide is silicon nitride. A length of each isosceles trapezoidal sub-waveguide of the first waveguide is 2 microns, and a height of each isosceles trapezoidal sub-waveguide of the first waveguide is 400 nanometers.

A material of the second waveguide is silicon. A length of each isosceles trapezoidal sub-waveguide of the second waveguide is 2 microns, and a height of each isosceles trapezoidal sub-waveguide of the second waveguide is 150 nanometers.

A material of the third waveguide is silicon. A length of each right-angled trapezoidal sub-waveguide of the third waveguide is 2 microns, and a height of each right-angled trapezoidal sub-waveguide of the third waveguide is 150 nanometers.

A material of the fourth waveguide is silicon. A length of each right-angled trapezoidal sub-waveguide of the fourth waveguide is 2 microns, and a height of each right-angled trapezoidal sub-waveguide of the fourth waveguide is 150 nanometers.

It should be noted that the polarization rotator 20 is located at a cladding layer, and a material of the cladding layer is silica or a polymer material. The polymer material may be polymethyl methacrylate (PMMA).

Figure 5:
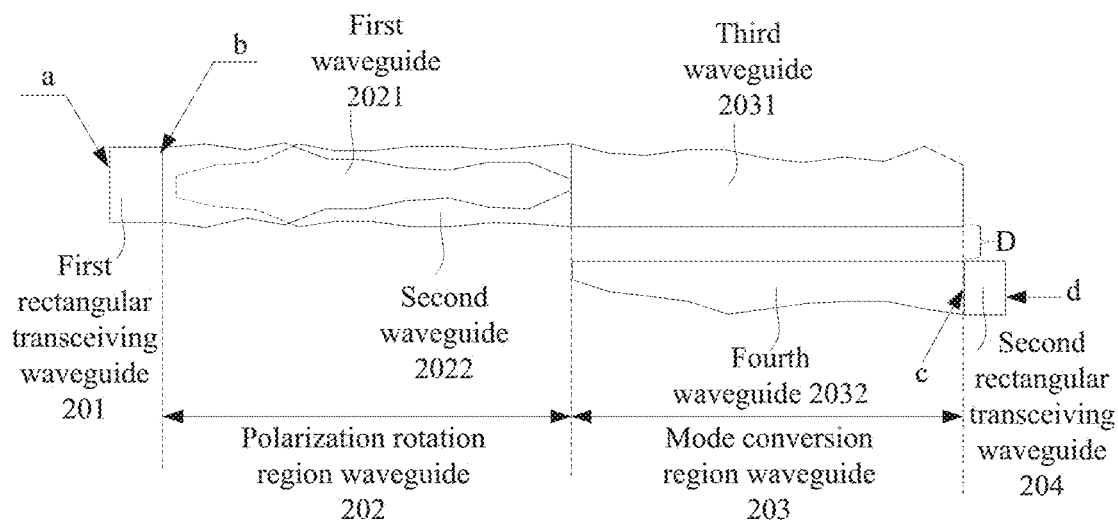
FIG. 5 is a top view of a polarization rotator according to an embodiment of the present invention.

FIG. 5 is a top view of the polarization rotator 20. A horizontal distance D between the third waveguide and the fourth waveguide is 200 nanometers.

Figure 6:
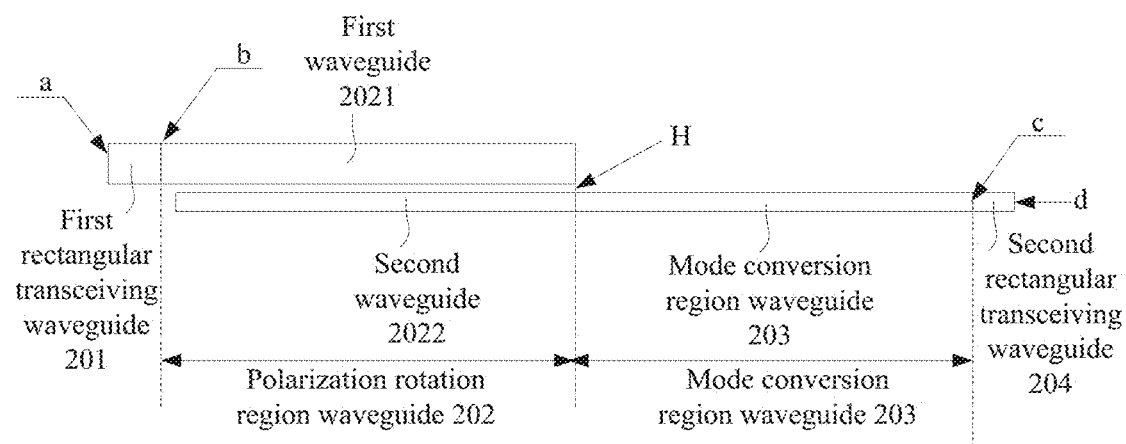
FIG. 6 is a side view of a polarization rotator according to an embodiment of the present invention.

FIG. 6 is a side view of the polarization rotator 20. A vertical spacing H between the second waveguide and the first waveguide is 50 nanometers.

sub-waveguides of the first waveguide 2021 respectively. s0 to s10 represent lengths between an upper base and a lower base of the isosceles trapezoidal sub-waveguides of the second waveguide 2022 respectively. s11 to s20 represent lengths between an upper base and a lower base of the right-angled trapezoidal sub-waveguides respectively. a0 to a6 represent lengths between an upper base and a lower base of the right-angled trapezoidal sub-waveguides respectively. See Table 1.

TABLE 1

Structural parameters of the polarization rotator

| Parameter | w0 | w1 | w2 | w3 | w4 | w5 | w6 | w7 | w8 | w9 | w10 |
|---|---|---|---|---|---|---|---|---|---|---|---|
| Parameter value (micron) | 1.4 | 1.536 | 1.621 | 1.519 | 0.912 | 0.854 | 0.554 | 0.508 | 0.817 | 0.867 | 0.2 |
| Parameter | a0 | a1 | a2 | a3 | a4 | a5 | a6 | a7 | a8 | a9 | a10 |
| Parameter value (micron) | 0.18 | 0.281 | 0.327 | 0.380 | 0.489 | 0.453 | 0.408 | 0.387 | 0.395 | 0.467 | 0.5 |
| Parameter | s0 | s1 | s2 | s3 | s4 | s5 | s6 | s7 | s8 | s9 | s10 |
| Parameter value (micron) | 0.18 | 0.385 | 0.427 | 0.807 | 0.728 | 0.708 | 0.758 | 0.747 | 0.728 | 0.749 | 0.8 |
| Parameter | s11 | s12 | s13 | s14 | s15 | s16 | s17 | s18 | s19 | s20 | |
| Parameter value (micron) | 0.721 | 0.701 | 0.761 | 0.758 | 0.686 | 0.631 | 0.677 | 0.652 | 0.781 | 0.6 | |

Figure 7:
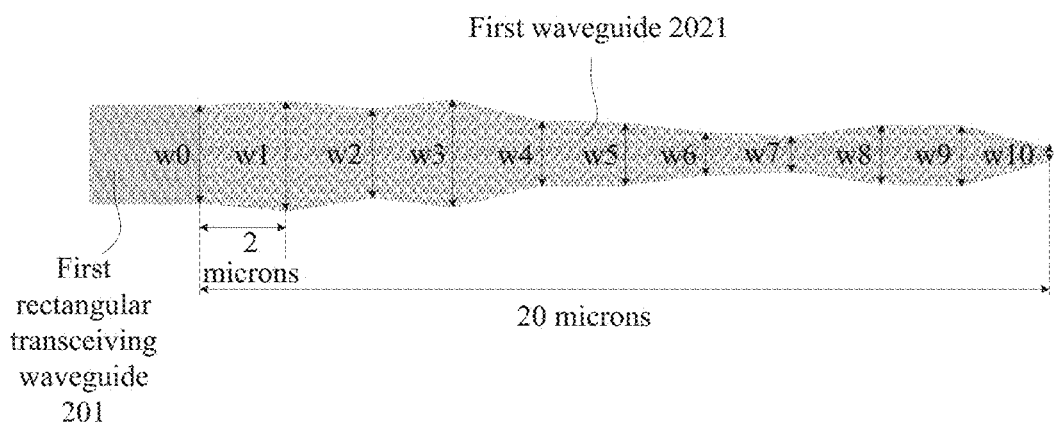
FIG. 7 is a top view of another polarization rotator according to an embodiment of the present invention.

FIG. 7 is a top view of the first waveguide 2021 of the polarization rotation region waveguide 202. A length of each isosceles trapezoidal sub-waveguide of the first waveguide 2021 is 2 microns, and a length of ten isosceles trapezoidal sub-waveguides is 20 microns. w0 to w10 represent lengths between an upper base and a lower base of the isosceles trapezoidal sub-waveguides respectively.

Figure 8:
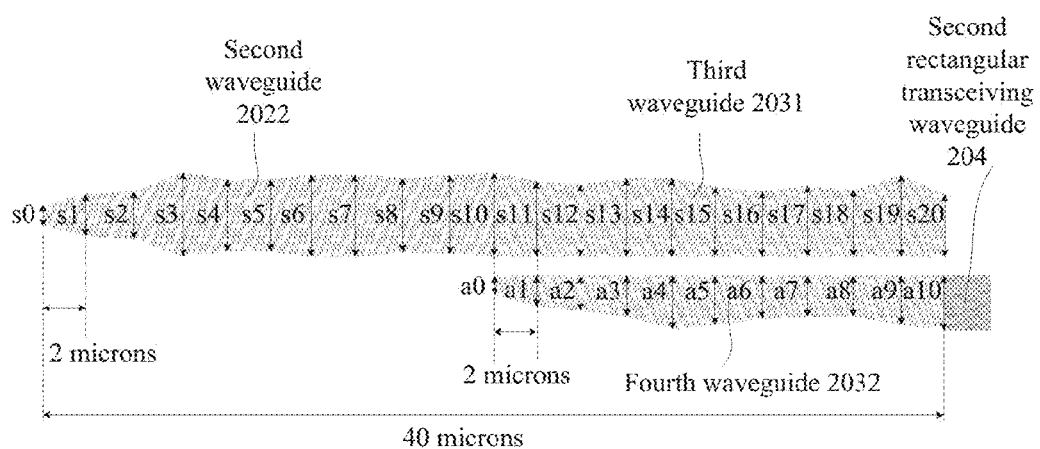
FIG. 8 is a top view of still another polarization rotator according to an embodiment of the present invention.

FIG. 8 is a top view of the second waveguide 2022 of the polarization rotation region waveguide 202, a top view of the third waveguide 2031 of the mode conversion region waveguide 203, and a top view of the fourth waveguide 2032 of the mode conversion region waveguide 203. A length of each isosceles trapezoidal sub-waveguide of the second waveguide 2022 is 2 microns, a length of each right-angled trapezoidal sub-waveguide of the third waveguide 2031 is 2 microns, a length of each right-angled trapezoidal sub-waveguide of the fourth waveguide 2032 is 2 microns, and a total length of the ten isosceles trapezoidal sub-waveguides and the ten right-angled trapezoidal sub-waveguides is 40 microns. s0 to s10 represent lengths between an upper base and a lower base of the isosceles trapezoidal sub-waveguides respectively. s11 to s20 represent lengths between an upper base and a lower base of the right-angled trapezoidal sub-waveguides of the third waveguide 2031 respectively. a0 to a10 represent lengths between an upper base and a lower base of the right-angled trapezoidal sub-waveguides of the fourth waveguide 2032 respectively.

Figure 9:
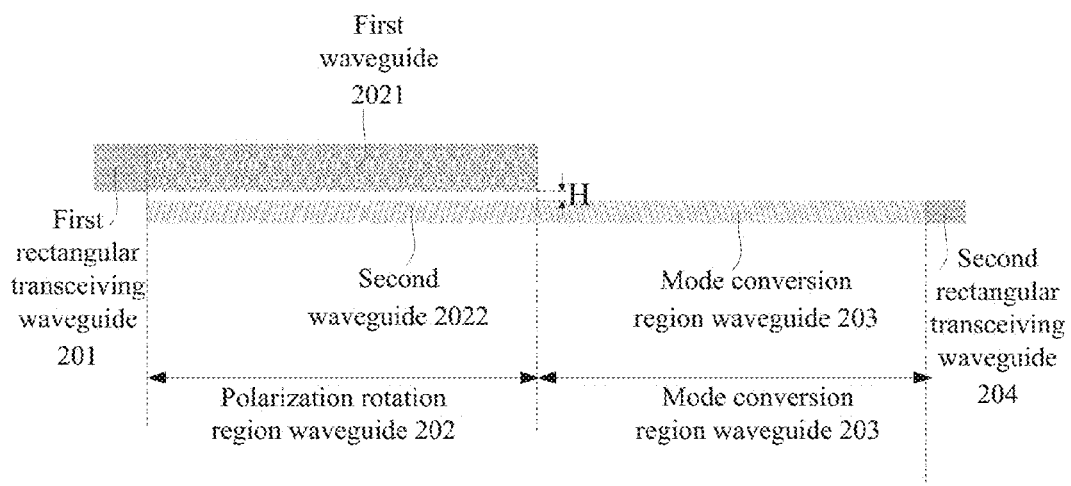
FIG. 9 is a side view of another polarization rotator according to an embodiment of the present invention.

FIG. 9 is a side view of the polarization rotator 20 based on FIG. 7 and FIG. 8.

Specifically, w0 to w10 represent lengths between an upper base and a lower base of the isosceles trapezoidal The first rectangular transceiving waveguide is configured to receive an L-order mode TM mode optical signal, the polarization rotation region waveguide is configured to convert the L-order mode TM mode optical signal into an N-order mode transverse electric wave TE mode optical signal, the mode conversion region waveguide is configured to convert the N-order mode TE mode optical signal into an M-order mode TE mode optical signal, and the second rectangular transceiving waveguide is configured to output the converted-to M-order mode TE mode optical signal, where N is not equal to M.

Alternatively, the second rectangular transceiving waveguide is configured to receive an M-order mode TE mode optical signal, the mode conversion region waveguide is configured to convert the M-order mode TE mode optical signal into an N-order mode TE mode optical signal, the polarization rotation region waveguide is configured to convert the N-order mode TE mode optical signal into an L-order mode TM mode optical signal, and the first rectangular transceiving waveguide is configured to output the converted-to L-order mode TM mode optical signal, where N is not equal to M.

It should be noted that an effective refractive index of a TE mode optical signal is adjusted by adjusting a width of the third waveguide and a width of the fourth waveguide, to obtain an order of the TE mode optical signal needed to be output. For example, lengths between the upper bases and lower bases of the right-angled trapezoidal sub-waveguides that form the third waveguide and the fourth waveguide may be adjusted, to adjust the width of the third waveguide and the width of the fourth waveguide.

Figure 10:
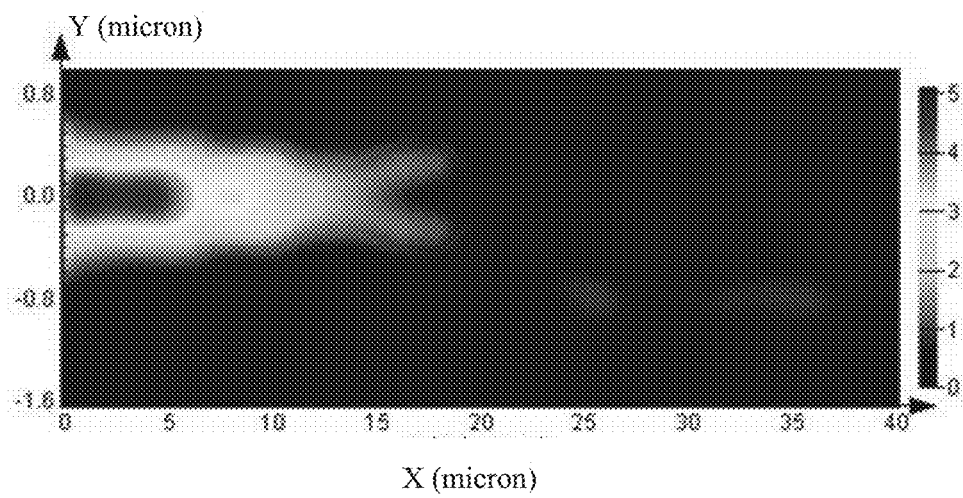
FIG. 10 is a schematic diagram of optical signal transmission according to an embodiment of the present invention.
Figure 11:
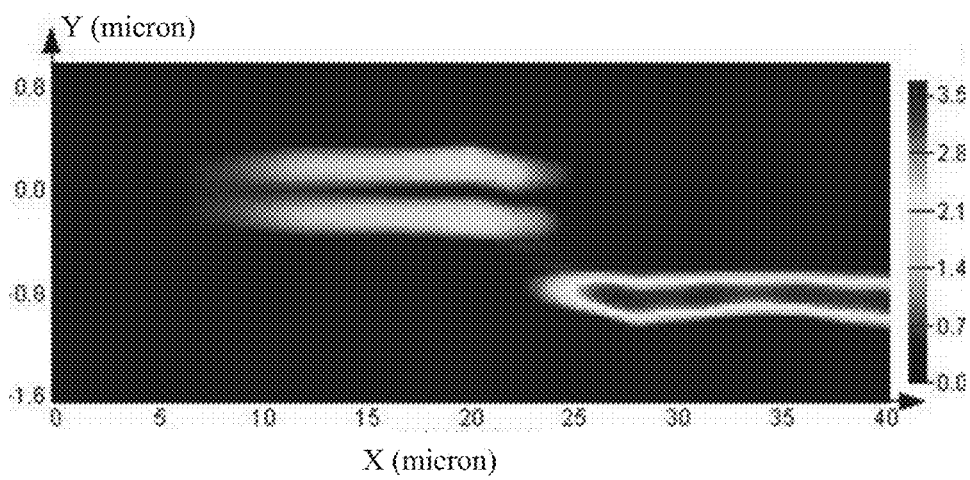
FIG. 11 is a schematic diagram of another optical signal transmission according to an embodiment of the present invention.

Specifically, when a TM0 mode optical signal is input from the first rectangular transceiving waveguide of the polarization rotator 20, performance parameters of a communications C-band (1530 nanometers to 1565 nanometers) are designed and optimized by using a three-dimensional (3D) finite difference time domain (FDTD) simulation technology. FIG. 10 shows energy distribution of TM0 mode optical signals when the TM0 mode optical signals are input. A TM0 mode optical signal received by the first waveguide is coupled to the second waveguide by using an evanescent wave between the first waveguide and the second waveguide, to obtain a TE1 mode optical signal. The TM0 mode optical signal gradually fades in a propagation direction inside the polarization rotator. The second waveguide outputs the TE1 mode optical signal to the third waveguide. The TE1 mode optical signal received by the third waveguide is coupled to the fourth waveguide by using an evanescent wave between the third waveguide and the fourth waveguide, to obtain a TE0 mode optical signal. The fourth waveguide outputs the TE0 mode optical signal to the second rectangular transceiving waveguide. The second rectangular transceiving waveguide outputs the converted-to TE0 mode optical signal. Almost no TM0 mode optical signal is output. FIG. 11 shows energy distribution of TE1 mode optical signals, where the TE1 mode optical signals gradually appear in the propagation direction inside the polarization rotator 20, and finally energy of TE0 mode optical signals is output in the second rectangular transceiving waveguide. With reference to FIG. 10 and FIG. 11, nearly all TM0 mode optical signals input by the first rectangular transceiving waveguide are converted into TE0 mode optical signals and output from the second rectangular transceiving waveguide. In this way, efficient conversion of polarization optical signals is implemented.

When a TE0 mode optical signal is input from the second rectangular transceiving waveguide, the fourth waveguide receives the TE0 mode optical signal transmitted by the second rectangular transceiving waveguide. The TE0 mode optical signal received by the fourth waveguide is coupled to the third waveguide by using an evanescent wave between the third waveguide and the fourth waveguide, to obtain a TE1 mode optical signal. The third waveguide outputs the TE1 mode optical signal to the second waveguide. The second waveguide receives the TE1 mode optical signal transmitted by the third waveguide. The TE1 mode optical signal received by the second waveguide is coupled to the first waveguide by using an evanescent wave between the second waveguide and the first waveguide, to obtain a TM0 mode optical signal. The first waveguide outputs the TM0 mode optical signal to the first rectangular transceiving waveguide. The first rectangular transceiving waveguide outputs the converted-to TM0 mode optical signal. Almost no TE0 mode optical signal is output. Almost all TE0 mode optical signals input by the second rectangular transceiving waveguide are converted into TM0 mode optical signals and output from the first rectangular transceiving waveguide. In this way, efficient conversion of polarization optical signals is implemented.

Figure 12:
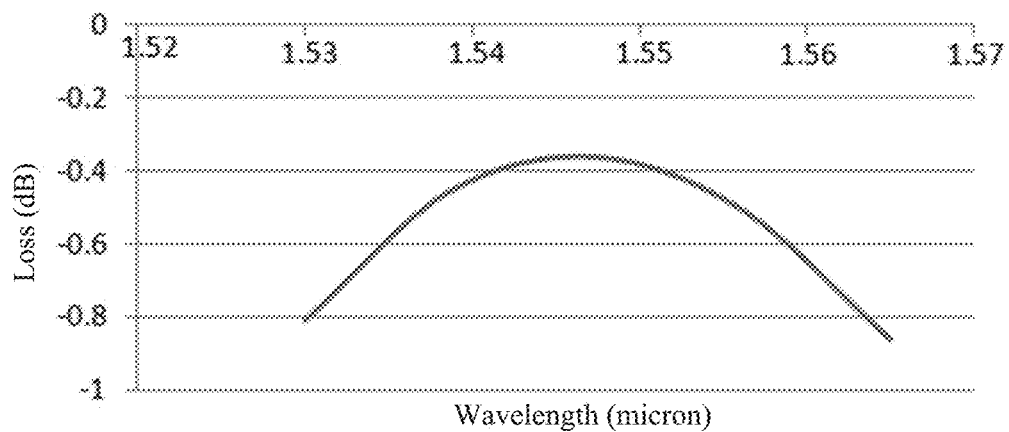
FIG. 12 is a schematic diagram of an optical signal insertion loss spectral line according to an embodiment of the present invention.

It should be noted that an insertion loss from a TM mode optical signal to a TE mode optical signal is 10*1 g (an output TE mode optical signal power/an input TM mode optical signal power), or an insertion loss from a TE mode optical signal to a TM mode optical signal is 10*1 g (an output TM mode optical signal power/an input TE mode optical signal power). FIG. 12 shows a spectral line for an insertion loss from a TM mode optical signal to a TE mode optical signal on a communications C-band, where for a center wavelength, the insertion loss is less than 0.4 dB, and for entire bandwidth, the insertion loss is less than 1.0 dB.

Figure 13:
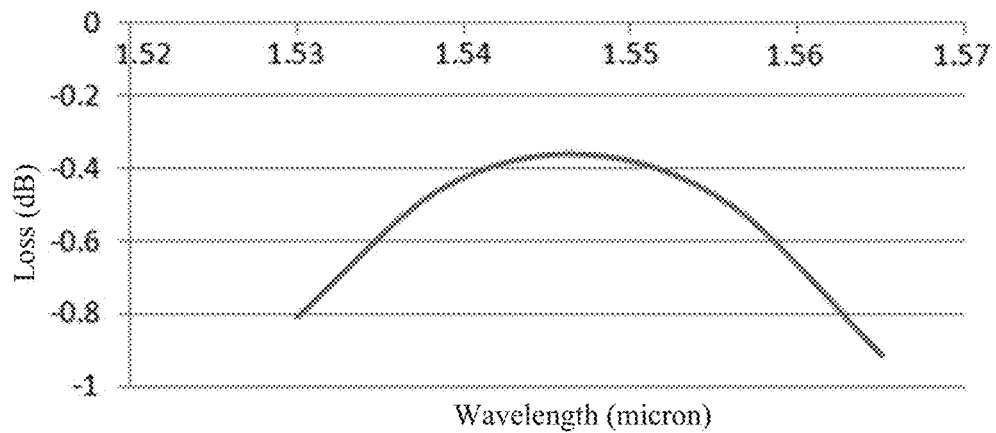
FIG. 13 is a schematic diagram of another optical signal insertion loss spectral line according to an embodiment of the present invention.

Similarly, as shown in FIG. 13, for a spectral line for an insertion loss from a TE mode optical signal to a TM mode optical signal on a communications C-band, performance is similar to the insertion loss from a TM mode optical signal to a TE mode optical signal.

In the polarization rotator described in the present invention, a polarization rotation region waveguide includes a first waveguide whose profile is non-linear and a second waveguide whose profile is non-linear; and a mode conversion region waveguide includes a third waveguide whose profile is non-linear and a fourth waveguide whose profile is non-linear. The first waveguide is located above the second waveguide. The fourth waveguide is on a same horizontal plane as the third waveguide and the second waveguide. Compared with the prior art in which a polarization optical signal is converted by using a longer linear profile waveguide, the polarization rotator described in the present invention is a non-linear profile waveguide. The non-linear profile waveguide better matches distribution of light energy, and a size of the polarization rotator can be reduced by reducing at least one of a length of the polarization rotation region waveguide or a length of the mode conversion region waveguide, so that higher conversion efficiency is achieved and a smaller size of the polarization rotator is ensured in a process of converting optical signal polarization states. In addition, the polarization rotator may be manufactured by using a complementary metal-oxide semiconductor process and by using a full etching process. The simple processes and low costs are favorable for large-scale manufacture.

It should be noted that the polarization rotation region waveguide and the mode conversion region waveguide in the polarization rotator described in this embodiment of the present invention may also be designed according to a mathematical function, and the polarization rotation region waveguide and the mode conversion region waveguide are designed as non-linear profile waveguides. The polarization rotation region waveguide designed according to the mathematical function may be an entirety, but not a polarization rotation region waveguide including at least two sub-waveguides. The mode conversion region waveguide designed according to the mathematical function may be an entirety, but not a mode conversion region waveguide including at least two sub-waveguides.

An embodiment of the present invention provides an optical signal processing method, applied to a polarization rotator. The polarization rotator includes a first transceiving waveguide, a polarization rotation region waveguide, a mode conversion region waveguide, and a second transceiving waveguide.

The first transceiving waveguide includes a first end and a second end. The polarization rotation region waveguide includes a first waveguide and a second waveguide. The first waveguide is located above the second waveguide, the first waveguide is connected to the second end of the first transceiving waveguide, the first waveguide is a non-linear profile waveguide, and the second waveguide is a non-linear profile waveguide. The mode conversion region waveguide includes a third waveguide and a fourth waveguide. The third waveguide is connected to the second waveguide, the fourth waveguide is on a same horizontal plane as the third waveguide and the second waveguide, the third waveguide is a non-linear profile waveguide, and the fourth waveguide is a non-linear profile waveguide. The first transceiving waveguide does not overlap the second waveguide. The second transceiving waveguide includes a third end and a fourth end. The third end of the second transceiving waveguide is connected to the fourth waveguide, and a distance between the fourth end and the second end of the first transceiving waveguide is greater than a distance between the third end and the second end of the first transceiving waveguide.

Figure 14:
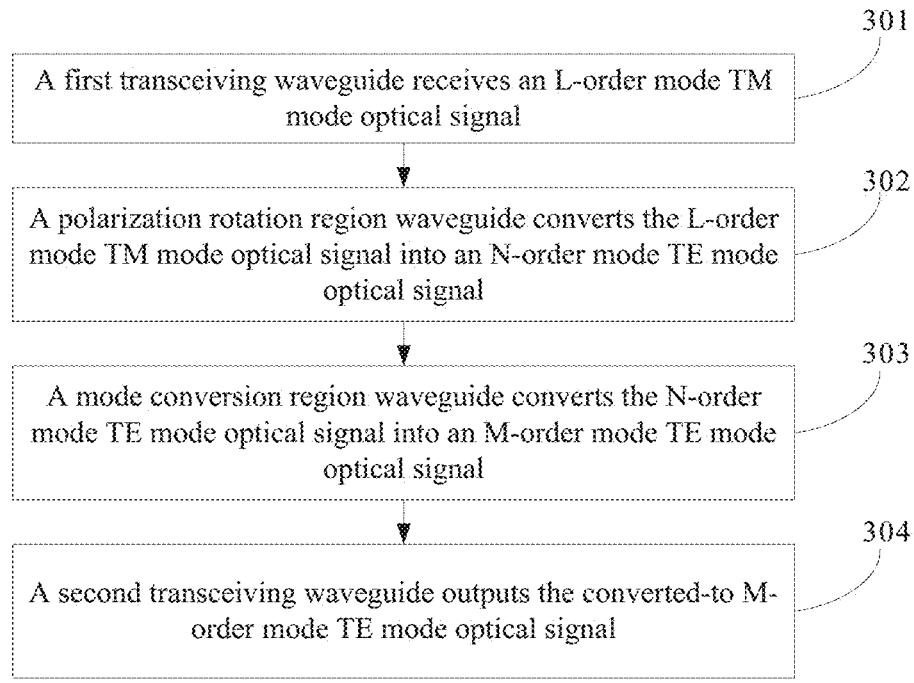
FIG. 14 is a flowchart of an optical signal processing method according to an embodiment of the present invention.

As shown in FIG. 14, the method includes:

Step 301: The first transceiving waveguide receives an L-order mode TM mode optical signal.

Step 302: The polarization rotation region waveguide converts the L-order mode TM mode optical signal into an N-order mode TE mode optical signal.

Step 303: The mode conversion region waveguide converts the N-order mode TE mode optical signal into an M-order mode TE mode optical signal.

Step 304: The second transceiving waveguide outputs the converted-to M-order mode TE mode optical signal.

N is not equal to M. L may be equal to N, or L may not be equal to N, or L may be equal to M, or L may not be equal to M.

Compared with the prior art in which a polarization optical signal is converted by using a longer linear profile waveguide, the polarization rotator described in the present invention is a non-linear profile waveguide. The non-linear profile waveguide better matches distribution of light energy, and a size of the polarization rotator can be reduced by reducing at least one of a length of the polarization rotation region waveguide or a length of the mode conversion region waveguide, so that a received L-order mode TM mode optical signal is converted into an N-order mode TE mode optical signal, the N-order mode TE mode optical signal is converted into an M-order mode TE mode optical signal, and the converted-to M-order mode TE mode optical signal is output. In this way, higher conversion efficiency is achieved and a smaller size of the polarization rotator is ensured in a process of converting optical signal polarization states.

Specifically, the converting, by the polarization rotation region waveguide, the L-order mode TM mode optical signal into an N-order mode transverse electric wave TE mode optical signal includes:

receiving, by the first waveguide, the L-order mode TM mode optical signal that is transmitted by the first transceiving waveguide;

coupling, to the second waveguide by using an evanescent wave between the first waveguide and the second waveguide, the L-order mode TM mode optical signal that is received by the first waveguide, to obtain the N-order mode TE mode optical signal; and outputting, by the second waveguide, the N-order mode TE mode optical signal to the third waveguide; and the converting, by the mode conversion region waveguide, the N-order mode TE mode optical signal into an M-order mode TE mode optical signal includes:

receiving, by the third waveguide, the N-order mode TE mode optical signal that is transmitted by the second waveguide;

coupling, to the fourth waveguide by using an evanescent wave between the third waveguide and the fourth waveguide, the N-order mode TE mode optical signal that is received by the third waveguide, to obtain the M-order mode TE mode optical signal; and outputting, by the fourth waveguide, the M-order mode TE mode optical signal to the second transceiving waveguide.

An embodiment of the present invention provides an optical signal processing method, applied to a polarization rotator. The polarization rotator includes a first transceiving waveguide, a polarization rotation region waveguide, a mode conversion region waveguide, and a second transceiving waveguide.

The first transceiving waveguide includes a first end and a second end. The polarization rotation region waveguide includes a first waveguide and a second waveguide. The first waveguide is located above the second waveguide, the first waveguide is connected to the second end of the first transceiving waveguide, the first waveguide is a non-linear profile waveguide, and the second waveguide is a non-linear profile waveguide. The mode conversion region waveguide includes a third waveguide and a fourth waveguide. The third waveguide is connected to the second waveguide, the fourth waveguide is on a same horizontal plane as the third waveguide and the second waveguide, the third waveguide is a non-linear profile waveguide, and the fourth waveguide is a non-linear profile waveguide. The first transceiving waveguide does not overlap the second waveguide. The second transceiving waveguide includes a third end and a fourth end. The third end of the second transceiving waveguide is connected to the fourth waveguide, and a distance between the fourth end and the second end of the first transceiving waveguide is greater than a distance between the third end and the second end of the first transceiving waveguide.

Figure 15:
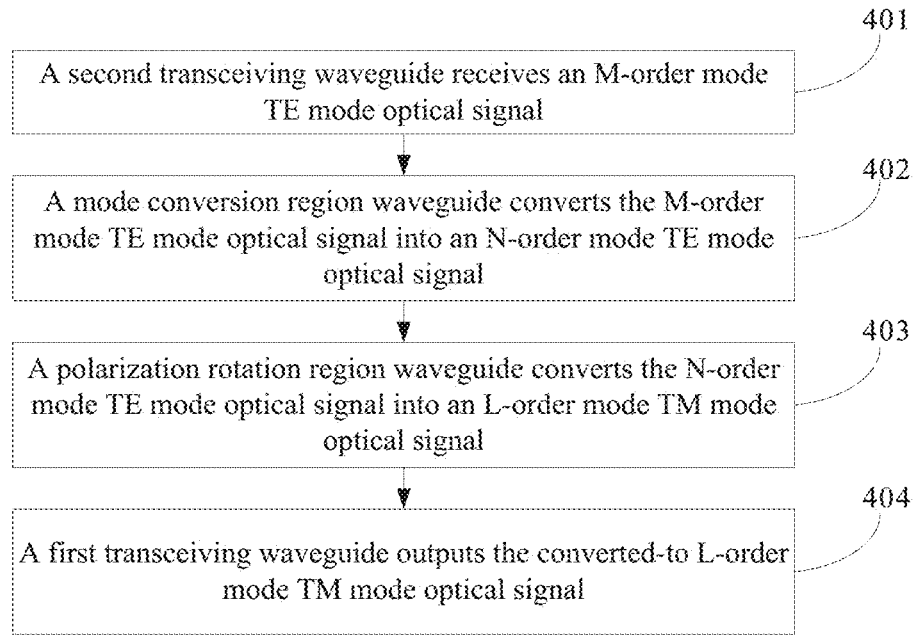
FIG. 15 is a flowchart of another optical signal processing method according to an embodiment of the present invention.

As shown in FIG. 15, the method includes:

Step 401: The second transceiving waveguide receives an M-order mode TE mode optical signal.

Step 402: The mode conversion region waveguide converts the M-order mode TE mode optical signal into an N-order mode TE mode optical signal.

Step 403: The polarization rotation region waveguide converts the N-order mode TE mode optical signal into an L-order mode TM mode optical signal.

Step 404: The first transceiving waveguide outputs the converted-to L-order mode TM mode optical signal.

N is not equal to M. L may be equal to N, or L may not be equal to N, or L may be equal to M, or L may not be equal to M.

Compared with the prior art in which a polarization optical signal is converted by using a longer linear profile waveguide, the polarization rotator described in the present invention is a non-linear profile waveguide. The non-linear profile waveguide better matches distribution of light energy, and a size of the polarization rotator can be reduced by reducing at least one of a length of the polarization rotation region waveguide or a length of the mode conversion region waveguide, so that a received M-order mode TE mode optical signal is converted into an N-order mode TE mode optical signal, the N-order mode TE mode optical signal is converted into an L-order mode TM mode optical signal, and the converted-to L-order mode TM mode optical signal is output. In this way, higher conversion efficiency is achieved and a smaller size of the polarization rotator is ensured in a process of converting optical signal polarization states.

Specifically, the converting, by the mode conversion region waveguide, the M-order mode TE mode optical signal into an N-order mode TE mode optical signal includes:

receiving, by the fourth waveguide, the M-order mode TE mode optical signal that is transmitted by the second transceiving waveguide;

coupling, to the third waveguide by using an evanescent wave between the third waveguide and the fourth waveguide, the M-order mode TE mode optical signal that is received by the fourth waveguide, to obtain the N-order mode TE mode optical signal; and outputting, by the third waveguide, the N-order mode TE mode optical signal to the second waveguide; and the converting, by the polarization rotation region waveguide, the N-order mode TE mode optical signal into an L-order mode transverse magnetic wave TM mode optical signal includes:

receiving, by the second waveguide, the N-order mode TE mode optical signal that is transmitted by the third waveguide;

coupling, to the first waveguide by using an evanescent wave between the second waveguide and the first waveguide, the N-order mode TE mode optical signal that is received by the second waveguide, to obtain the L-order mode TM mode optical signal; and outputting, by the first waveguide, the L-order mode TM mode optical signal to the first transceiving waveguide.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A polarization rotator, comprising:
a first transceiving waveguide having a first end and a second end;
a polarization rotation region waveguide having a first waveguide and a second waveguide, wherein the first waveguide is located above the second waveguide, the first waveguide is connected to the second end of the first transceiving waveguide, the first waveguide is a non-linear profile waveguide, and the second waveguide is a non-linear profile waveguide;
a mode conversion region waveguide having a third waveguide and a fourth waveguide, wherein the third waveguide is connected to the second waveguide, the fourth waveguide is on a same horizontal plane as the third waveguide and the second waveguide, the third waveguide is a non-linear profile waveguide, and the fourth waveguide is a non-linear profile waveguide, wherein
the first transceiving waveguide does not overlap the second waveguide; and
a second transceiving waveguide having a third end and a fourth end, wherein the third end of the second transceiving waveguide is connected to the fourth waveguide, a distance between the fourth end and the second end of the first transceiving waveguide is greater than a distance between the third end and the second end of the first transceiving waveguide; wherein
the first transceiving waveguide is configured to receive an L-order mode transverse magnetic wave (TM) mode optical signal, the polarization rotation region waveguide is configured to convert the L-order mode TM mode optical signal into an N-order mode transverse electric wave (TE) mode optical signal, the mode conversion region waveguide is configured to convert the N-order mode TE mode optical signal into an M-order mode TE mode optical signal, and the second transceiving waveguide is configured to output the converted-to M-order mode TE mode optical signal, wherein N is not equal to M; or the second transceiving waveguide is configured to receive an M-order mode TE mode optical signal, the mode conversion region waveguide is configured to convert the M-order mode TE mode optical signal into an N-order mode TE mode optical signal, the polarization rotation region waveguide is configured to convert the N-order mode TE mode optical signal into an L-order mode TM mode optical signal, and the first transceiving waveguide is configured to output the converted-to L-order mode TM mode optical signal, wherein N is not equal to M.

2. The polarization rotator according to claim 1, wherein the first waveguide includes at least two sub-waveguides, the second waveguide includes at least two sub-waveguides, sizes and shapes of the sub-waveguides are different, the sub-waveguides in the first waveguide are connected sequentially, and the sub-waveguides in the second waveguide are connected sequentially; and
the third waveguide includes at least two sub-waveguides, the fourth waveguide includes at least two sub-waveguides, sizes and shapes of the sub-waveguides are different, the sub-waveguides in the third waveguide are connected sequentially, and the sub-waveguides in the fourth waveguide are connected sequentially.

3. The polarization rotator according to claim 2, wherein a length of each sub-waveguide is greater than 0 microns and is less than or equal to 2 microns.

4. The polarization rotator according to claim 2, wherein the first transceiving waveguide and the second transceiving waveguide are rectangular waveguides, the sub-waveguides of the first waveguide are trapezoidal waveguides, the sub-waveguides of the second waveguide are trapezoidal waveguides, the sub-waveguides of the third waveguide are trapezoidal waveguides, and the sub-waveguides of the fourth waveguide are trapezoidal waveguides.

5. The polarization rotator according to claim 2, wherein a height of the first transceiving waveguide is greater than or equal to 200 nanometers and is less than or equal to 1000 nanometers, and a height of the sub-waveguide of the first waveguide is greater than or equal to 200 nanometers and is less than or equal to 1000 nanometers.

6. The polarization rotator according to claim 2, wherein a height of the sub-waveguide of the second waveguide is greater than or equal to 100 nanometers and is less than or equal to 500 nanometers, a height of the sub-waveguide of the third waveguide is greater than or equal to 100 nanometers and is less than or equal to 500 nanometers, a height of the sub-waveguide of the fourth waveguide is greater than or equal to 100 nanometers and is less than or equal to 500 nanometers, and a height of the second transceiving waveguide is greater than or equal to 100 nanometers and is less than or equal to 500 nanometers.

7. The polarization rotator according to claim 2, wherein the first transceiving waveguide and the second transceiving waveguide are rectangular waveguides, the sub-waveguides of the first waveguide are isosceles trapezoidal waveguides of different sizes, the sub-waveguides of the second waveguide are isosceles trapezoidal waveguides of different sizes, the sub-waveguides of the third waveguide are right-angled trapezoidal waveguides of different sizes, and the sub-waveguides of the fourth waveguide are right-angled trapezoidal waveguides of different sizes.

8. The polarization rotator according to claim 1, wherein a vertical spacing between the first waveguide and the second waveguide is greater than 0 microns and is less than or equal to 1 micron.

9. The polarization rotator according to claim 1, wherein a horizontal distance between the third waveguide and the fourth waveguide is greater than or equal to 10nanometers and is less than or equal to 500 nanometers.

10. The polarization rotator according to claim 1, wherein materials of the first transceiving waveguide and the first waveguide are silicon nitride, and materials of the second waveguide, the third waveguide, the fourth waveguide, and the second transceiving waveguide are silicon.

11. The polarization rotator according to claim 1, wherein the polarization rotator is located in a cladding layer, and a material of the cladding layer is silica or a polymer material.

12. An optical signal processing method, applied to a polarization rotator, the polarization rotator having a first transceiving waveguide, a polarization rotation region waveguide, a mode conversion region waveguide, and a second transceiving waveguide, and
the first transceiving waveguide having a first end and a second end; the polarization rotation region waveguide having a first waveguide and a second waveguide, wherein the first waveguide is located above the second waveguide, the first waveguide is connected to the second end of the first transceiving waveguide, the first waveguide is a non-linear profile waveguide, and the second waveguide is a non-linear profile waveguide; the mode conversion region waveguide having a third waveguide and a fourth waveguide, wherein the third waveguide is connected to the second waveguide, the fourth waveguide is on a same horizontal plane as the third waveguide and the second waveguide, the third waveguide is a non-linear profile waveguide, and the fourth waveguide is a non-linear profile waveguide, wherein the first transceiving waveguide does not overlap the second waveguide; and the second transceiving waveguide having a third end and a fourth end, wherein the third end of the second transceiving waveguide is connected to the fourth waveguide, and a distance between the fourth end and the second end of the first transceiving waveguide is greater than a distance between the third end and the second end of the first transceiving waveguide; and
the method comprises:
receiving, by the first transceiving waveguide, an L-order mode transverse magnetic wave (TM) mode optical signal;
converting, by the polarization rotation region waveguide, the L-order mode TM mode optical signal into an N-order mode transverse electric wave (TE) mode optical signal;
converting, by the mode conversion region waveguide, the N-order mode TE mode optical signal into an M-order mode TE mode optical signal; and
outputting, by the second transceiving waveguide, the converted-to M-order mode TE mode optical signal, wherein
N is not equal to M.

13. The method according to claim 12, wherein
the converting, by the polarization rotation region waveguide, the L-order mode TM mode optical signal into an N-order mode transverse electric wave (TE) mode optical signal comprises:
receiving, by the first waveguide, the L-order mode TM mode optical signal that is transmitted by the first transceiving waveguide;
coupling, to the second waveguide by using an evanescent wave between the first waveguide and the second waveguide, the L-order mode TM mode optical signal that is received by the first waveguide, to obtain the N-order mode TE mode optical signal; and
outputting, by the second waveguide, the N-order mode TE mode optical signal to the third waveguide; and
the converting, by the mode conversion region waveguide, the N-order mode TE mode optical signal into an M-order mode TE mode optical signal comprises:
receiving, by the third waveguide, the N-order mode TE mode optical signal that is transmitted by the second waveguide;
coupling, to the fourth waveguide by using an evanescent wave between the third waveguide and the fourth waveguide, the N-order mode TE mode optical signal that is received by the third waveguide, to obtain the M-order mode TE mode optical signal; and
outputting, by the fourth waveguide, the M-order mode TE mode optical signal to the second transceiving waveguide.

14. An optical signal processing method, applied to a polarization rotator, the polarization rotator having a first transceiving waveguide, a polarization rotation region waveguide, a mode conversion region waveguide, and a second transceiving waveguide, and
the first transceiving waveguide having a first end and a second end; the polarization rotation region waveguide having a first waveguide and a second waveguide, wherein the first waveguide is located above the second waveguide, the first waveguide is connected to the second end of the first transceiving waveguide, the first waveguide is a non-linear profile waveguide, and the second waveguide is a non-linear profile waveguide; the mode conversion region waveguide having a third waveguide and a fourth waveguide, wherein the third waveguide is connected to the second waveguide, the fourth waveguide is on a same horizontal plane as the third waveguide and the second waveguide, the third waveguide is a non-linear profile waveguide, and the fourth waveguide is a non-linear profile waveguide, wherein the first transceiving waveguide does not overlap the second waveguide; and the second transceiving waveguide having a third end and a fourth end, wherein the third end of the second transceiving waveguide is connected to the fourth waveguide, and a distance between the fourth end and the second end of the first transceiving waveguide is greater than a distance between the third end and the second end of the first transceiving waveguide; and
the method comprises:
receiving, by the second transceiving waveguide, an M-order mode transverse electric wave (TE) mode optical signal;
converting, by the mode conversion region waveguide, the M-order mode TE mode optical signal into an N-order mode TE mode optical signal;
converting, by the polarization rotation region waveguide, the N-order mode TE mode optical signal into an L-order mode transverse magnetic wave (TM) mode optical signal; and
outputting, by the first transceiving waveguide, the converted-to L-order mode TM mode optical signal, wherein
N is not equal to M.

15. The method according to claim 14, wherein
the converting, by the mode conversion region waveguide, the M-order mode TE mode optical signal into an N-order mode TE mode optical signal comprises:

receiving, by the fourth waveguide, the M-order mode TE mode optical signal that is transmitted by the second transceiving waveguide;

coupling, to the third waveguide by using an evanescent wave between the third waveguide and the fourth waveguide, the M-order mode TE mode optical signal that is received by the fourth waveguide, to obtain the N-order mode TE mode optical signal; and outputting, by the third waveguide, the N-order mode TE mode optical signal to the second waveguide; and the converting, by the polarization rotation region waveguide, the N-order mode TE mode optical signal into an L-order mode transverse magnetic wave TM mode optical signal comprises:

receiving, by the second waveguide, the N-order mode TE mode optical signal that is transmitted by the third waveguide;

coupling, to the first waveguide by using an evanescent wave between the second waveguide and the first waveguide, the N-order mode TE mode optical signal that is received by the second waveguide, to obtain the L-order mode TM mode optical signal; and outputting, by the first waveguide, the L-order mode TM mode optical signal to the first transceiving waveguide.

16. The polarization rotator according to claim 1, wherein a profile of the non-linear profile waveguide along a light propagation direction of the mode conversion region waveguide is a curve, a fold surface, or a broken line.

* * * * *

UNITED STATES PATENT AND TRADEMARK OFFICE
CERTIFICATE OF CORRECTION

PATENT NO. : 10,241,273 B2
APPLICATION NO. : 15/795626
DATED : March 26, 2019
INVENTOR(S) : Xin Tu et al.

Page 1 of 1

It is certified that error appears in the above-identified patent and that said Letters Patent is hereby corrected as shown below:

In the Claims

Column 17, Line 3, In Claim 9, delete "10nanometers" and insert -- 10 nanometers --, therefor.

Signed and Sealed this
Third Day of December, 2019

Andrei Iancu
*Director of the United States Patent and Trademark Office*